United States Patent [19]

Nishino et al.

[11] 4,038,159

[45] July 26, 1977

[54] METHOD FOR FABRICATION OF MANGANESE OXIDE SOLID ELECTROLYTE CAPACITOR

[75] Inventors: Atsushi Nishino; Hayashi Hayakawa; Hiroshi Kumano, all of Kadoma, Japan

[73] Assignee: Matsushita Electric Industrial Co., Ltd., Japan

[21] Appl. No.: 632,079

[22] Filed: Nov. 14, 1975

[30] Foreign Application Priority Data

Nov. 19, 1974 Japan ............................ 49-133999

[51] Int. Cl.$^2$ .......................................... H01G 9/05
[52] U.S. Cl. .................................. 204/38 A; 427/80; 427/226; 427/419 B; 361/322
[58] Field of Search ............... 204/38 A; 427/80, 226, 427/419 B; 428/469, 539; 432/200, 205, 31, 47; 317/230

[56] References Cited

U.S. PATENT DOCUMENTS

| | | | |
|---|---|---|---|
| 1,804,782 | 5/1931 | Koenig | 432/47 X |
| 2,066,358 | 1/1937 | Musso | 432/205 X |
| 3,302,074 | 1/1967 | Black | 317/230 |
| 3,337,429 | 8/1967 | Zind | 204/38 A |
| 3,359,191 | 12/1967 | Minami et al. | 204/38 A |
| 3,448,969 | 6/1969 | Windsor | 432/47 |
| 3,473,092 | 10/1969 | Silgailis | 317/230 |
| 3,607,385 | 9/1971 | Namikata et al. | 427/80 |
| 3,850,764 | 11/1974 | Herczog et al. | 204/38 A |

Primary Examiner—G. L. Kaplan
Attorney, Agent, or Firm—Robert E. Burns; Emmanuel J. Lobato; Bruce L. Adams

[57] ABSTRACT

A manganese dioxide layer of improved quality is formed on an anodized valve metal substrate by repeating only a few times the steps of immersing the substrate in an aqueous solution of manganese nitrate and heating the wet substrate to cause pyrolytic decomposition of manganese nitrate to manganese dioxide in a semiclosed radiant furnace, wherein the decomposition proceeds under a positive pressure of a small magnitude due to prolonged retention of gaseous decomposition products.

15 Claims, 18 Drawing Figures

D = 6 mm

D = 13mm

10μm

10μm

10μm

10μm

METHOD FOR FABRICATION OF MANGANESE OXIDE SOLID ELECTROLYTE CAPACITOR

This invention relates to a solid electrolyte capacitor which has a layer of manganese dioxide as the solid electrolyte and a method for the fabrication of the same, and more particularly to a method of forming a manganese dioxide layer of improved quality, wherein pyrolytic decomposition of manganese nitrate applied onto the surface of a dielectric coating on the anode is repeated only a few times on condition that the decomposition is caused to proceed in an atmosphere which contains the decomposition gas and is maintained at a positive pressure of a small magnitude.

Manganese dioxide is known and widely used as an excellent electrolyte material in a solid electrolyte capacitor. In conventional methods for the fabrication of a solid electrolyte capacitor having an anode of a valve-metal typified by aluminum and tantalum and a thin layer of manganese dioxide as the electrolyte, the manganese dioxide layer is formed by initially anodizing the valve-metal to form thereon a thin oxide coating which serves as the dielectric of the capacitor, immersing the oxide-coated anode in an aqueous solution of manganese nitrate, and then heating the wet anode to about 130° to 350° C either in a hot-air conveying or circulating furnace or in an electric furnace to cause pyrolytic decomposition of the adhering manganese nitrate to manganese dioxide.

Unfortunately, several problems remain unsolved in forming the manganese dioxide layer by these procedures. Firstly, it is very difficult to obtain a manganese dioxide layer which is uniform in denseness, thickness and adhesion to the dielectric oxide over the entire area by a single cycle of the above described procedures. The reason for the difficulty is found in the fact that the manganese nitrate solution is not always applied uniformly and thickly onto the dielectric which has a microscopically rough or rugged surface and in the tendency that a rapid evaporation of water at the initial stage of the heating for the pyrolysis prevents manganese nitrate from depositing densely on the surface of the dielectric. Accordingly, it is necessary to repeat a series of procedures about 10 times, each series consisting of immersion in the manganese nitrate solution, heating for pyrolytic decomposition and then reforming. The resulting manganese dioxide layer, however, is not fully satisfactory in denseness, porosity, particle size, closeness of contact with the dielectric oxide coating and, hence, healing or reforming effect on the dielectric oxide coating. Besides, the repeated exposure to a high temperature is unfavorable to the dielectric oxide coating. Consequently, solid electrolyte capacitor of the foregoing type which is produced by a conventional method tends to have unstable characteristics and exhibit relatively poor breakdown voltage and insulation, so that the industrial fabrication of the capacitor has suffered from relatively high percentage of defective products and high production costs.

It is an object of the present invention to provide an improved method for the production of a solid electrolyte capacitor utilizing manganese dioxide as the electrolyte, which method overcomes the foregoing problems inherent to conventional production methods including a heating procedure for the pyrolytic decomposition of manganese nitrate to manganese dioxide.

It is another object of the invention to provide a method for the production of the solid electrolyte capacitor of the above described type, in which method a manganese dioxide layer of improved quality can be formed by repeating the aforementioned pyrolytic decomposition only a far smaller number of times than in conventional production methods.

It is still another object of the invention to provide a solid electrolyte capacitor of the above described type, which has a uniformly and stably formed manganese dioxide layer and exhibits improved characteristics in the dielectric loss, impedance, leakage current and frequency dependence.

According to the present invention, a valve-metal is initially anodized in a usual manner to form thereon a dielectric oxide coating and then wetted with an aqueous solution of manganese nitrate. As an essential feature of a method according to the invention, the wet valve-metal is subjected to heating for pyrolytic decomposition of the adhering manganese nitrate to manganese dioxide in a semi-closed heating chamber of a radiant furnace having a vent the area of which is relatively small with respect to the volume of the heating chamber, wherein the heat for the decomposition is transferred to the substrate from the wall of the heating chamber dominantly by radiation and the decomposition proceeds under a positive pressure of a small magnitude due to prolonged retention of gaseous decomposition products in the heating chamber.

A solid electrolyte capacitor produced by a method according to the invention is characterized by comprising a layer of manganese dioxide which is formed on and in intimate contact with the surface of a dielectric oxide coating formed on a valve-metal and consists of manganese dioxide particles which are in dense aggregation and relatively uniform in the particle size within the range from 0.1 to 50 μm.

Other features and advantages of the invention will become apparent from the following detailed description with reference to the accompanying drawings, wherein.

Figure 1:
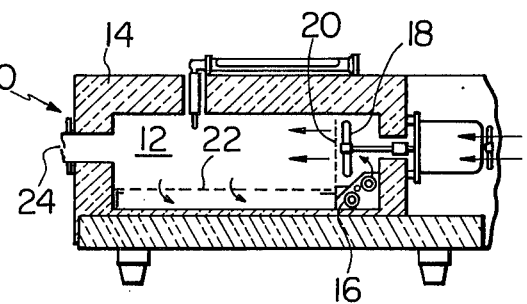
FIG. 1 is a longitudinal sectional view of a furnace of the hot-air circulation type which is used for forming a manganese dioxide layer in a conventional method of producing a solid electrolyte capacitor.
Figure 2:
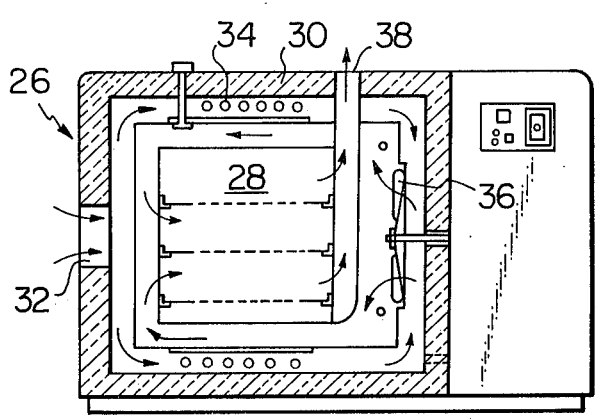
FIG. 2 is a longitudinal sectional view of a fundamentally similar but differently constructed conventional furnace for the same use.

In conventional methods for the fabrication of a manganese dioxide solid electrolyte capacitor, the pyrolytic decomposition of an aqueous solution of manganese nitrate applied onto the surface of a dielectric coating formed on a valve-metal anode is carried out usually in a furnace of the hot-air circulation type as shown in FIG. 1 or FIG. 2. The furnace 10 of FIG. 1 has a heating chamber 12 which is formed in a heat-insulating wall member or body 14, fin heaters 16, a fan 18 for the circulation of hot-air, a dispersion plate 20 for regulating the flow of hot-air, a rack 22 and a vent damper 24. Also in the furnace 26 of FIG. 2, a heating chamber 28 is formed in a heat-insulating body 30. Air is admitted into the furnace 26 through an inlet 32, heated by pipe heaters 34 and then forced to pass through the heating chamber 28 by a fan 36. A vent is indicated at 38.

It will be understood that the pyrolysis of the manganese nitrate solution in conventional methods for forming the manganese dioxide layer is carried out in a stream of hot-air practically under the atmospheric pressure. Such a condition is employed mainly for the following purposes: firstly to achieve uniform temperature distribution in the heating chamber, and secondly to expel the decomposition gas which contains oxides of nitrogen ($NO_x$) from the heating chamber as rapidly as possible so that $NO_x$ may not exert any influence on the anode under the treatment.

The foregoing technique, however, involves various disadvantages as summarized below.

1. The pyrolysis procedure needs to be repeated many times, usually about 10 times.

2. It is necessary to use two or three differently concentrated manganese nitrate solutions since the use of a relatively dilute solution is mandatory during an initial part of the repetition of the procedure to produce a capacitor having a relative capacitance close to a theoretical value.

Figure 14:
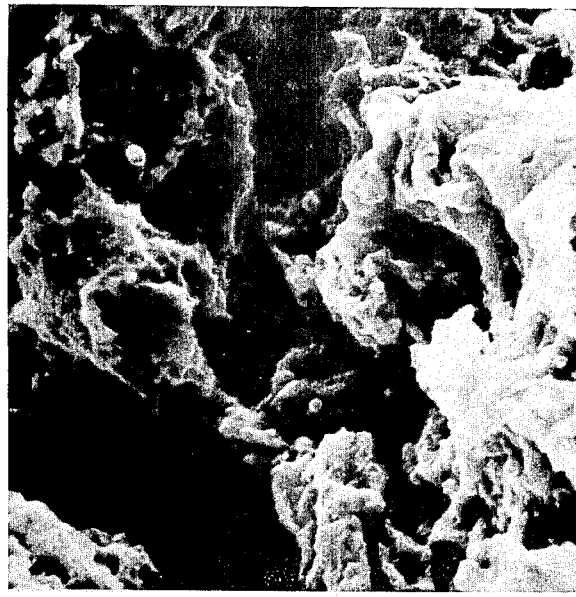
FIG. 14 is a microphotograph taken with a scanning electron microscope of a manganese dioxide layer formed by a conventional method.

3. The manganese dioxide layer is formed as a porous, thick and rugged one consisting of relatively large-sized particles as seen in the microphotograph of FIG. 14 (the magnification is 1000X).

4. A capacitor as the end product suffers from unsatisfactory frequency characteristic and leakage current.

5. The furnace needs to have a powerful fan for maintaining a uniform temperature distribution in the heating chamber and accordingly consumes a relatively large quantity of power.

6. The furnace is inevitably large-sized to accomplish an effective circulation of hot-air, so that difficulty arises in controlling the chamber temperature accurately.

7. Thermal efficiency of the furnace is relatively poor, and the cost of facilities in the production of the capacitor is relatively high.

Figure 3:
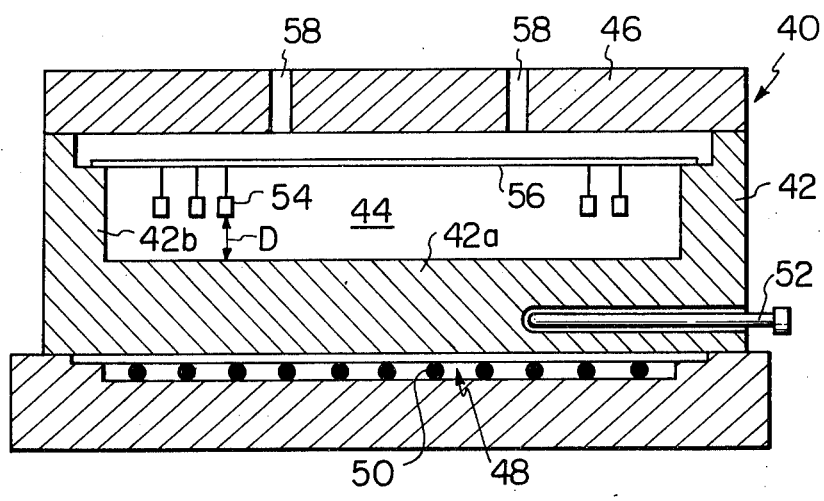
FIG. 3 is a longitudinal sectional view of a semi-closed radiant furnace which is used for the same purpose in a method according to the invention.

According to the invention, the pyrolytic decomposition of a manganese nitrate solution is carried out in a radiant furnace in which neither circulation nor stirring of air is forced. Referring now to FIG. 3, the body 42 of a furnace 40 for use in a method according to the invention is not made of a heat-insulating material but is made of a highly heat-conductive material, which is selected usually from metals such as iron, nickel, copper and aluminum, including alloys of these metals. Alternatively, the body 42 may be made of a non-metallic material which exhibits a good heat conductivity at elevated temperatures as typified by silicon carbide. The furnace 40 has a heating chamber 44 formed in the body 42, a lid member 46 covering the heating chamber 44 and a heating device 48 including heater elements 50 arranged below and adjacent the bottom 42a of the body 42. A usual temperature control apparatus is omitted from the illustration except for a temperature sensor 52. A valve metal 54 which is coated with a dielectric oxide film and wet with an aqueous solution of manganese nitrate (this will hereinafter be referred to simply as a substrate or a wet substrate) is held in the heating chamber 44, either singularly or in plurality, to avoid any contact with the inner surfaces of the wall 42 and lid 46, for example, by being suspended from a bar-like holder 56. It is an essential requisite to the furnace 40 that the heating chamber 44 is semi-closed during heating. The heating chamber 44 communicates with the atmosphere exclusively through a vent 58 formed in the lid 46. The vent 58 is shown as two apertures, but may consist of either a single wider aperture or a larger number of narrower apertures. In any way, the total effective sectional area of the vent 58 is determined to be a relatively small value as hereinafter will be described compared with the area of the vent 38 in the presently used furnace 26.

Figure 4:
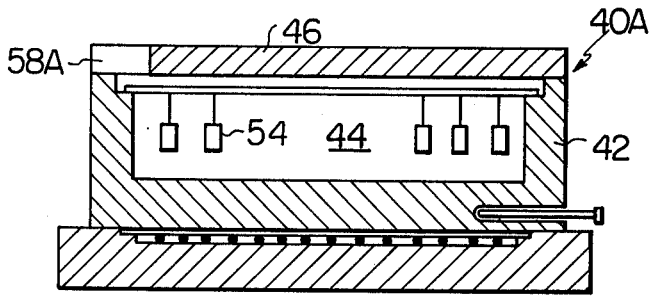
FIGS. 4 and 5 are fundamentally similar views to FIG. 3 but show two variations of the vent of the furnace, respectively.

The vent 58 is not necessarily formed as an aperture in the lid 46. In a fundamentally similar furnace 40A of FIG. 4, the lid 46 has a slit 58A formed in an end region. In a furnace 40B of FIGS. 5 and 6, the lid 46 is shaped to have ridges 60 which are shaped in cross-section like saw-tooth as seen in FIG. 6 on the inside surface at the corner portions of the front and rear end regions, so that the grooves 58B between the ridges 60 serve as the vent.

Figure 5:
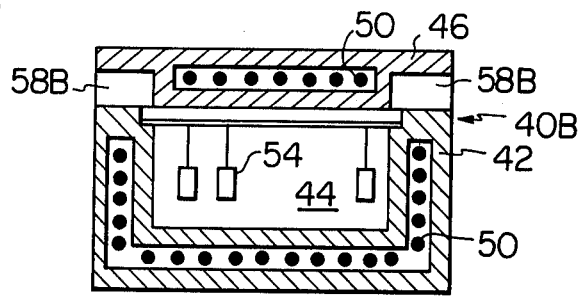
Figure 6:
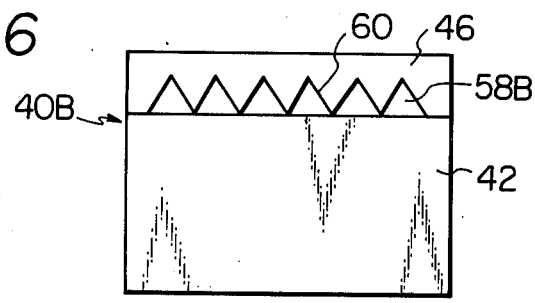
FIG. 6 is a front view of the furnace of FIG. 5.
Figure 7:
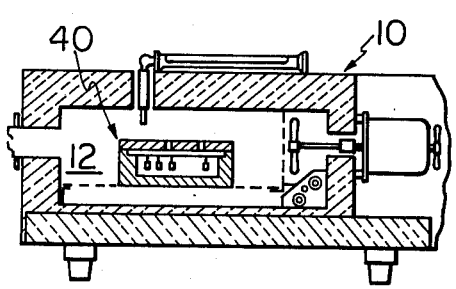
FIG. 7 is a longitudinal sectional view of a conventional furnace similar to the furnace of FIG. 1 in which the furnace of FIG. 3 is placed.

The chamber 44 may be heated from any direction as exemplified by heaters 50 in FIG. 5 which are embedded in the body 42 and lid 46 of the furnace 40B. To preclude any influence of the ambient temperature, any of the furnaces 40, 40A and 40B may be placed in the hot-air circulation furnace 10 as shown in FIG. 7. This is practicable since the furnace 40, for example, employed in the invention can be made very small due to necessity of no forced circulation of air in the heating chamber 44 and hence provision of no fan.

Figure 8:
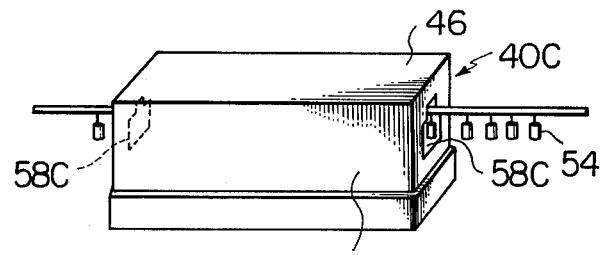
FIG. 8 and 9 are perspective views of two differently modified furnaces for use in a method according to the invention, respectively.
Figure 9:
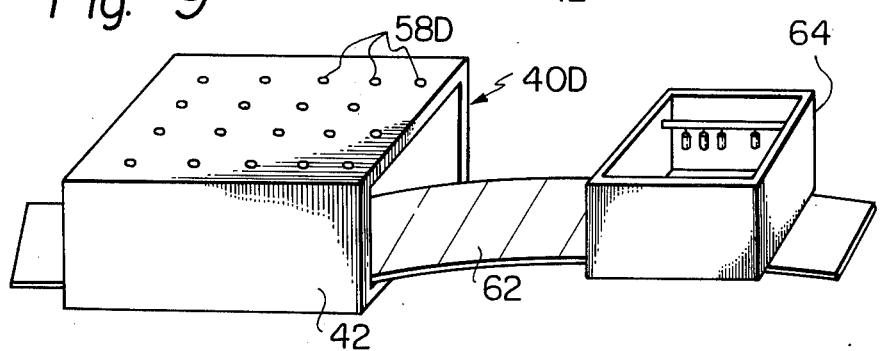

As a still different variation, FIG. 8 shows a furnace 40C wherein the lid 46 is integrated with the body 42 and has no vent. Instead, an aperture 58C which serves as a vent is formed in each of the front and rear walls 42b of the body 42. This furnace 40C is designed to allow the holder 56 to pass through the apertures 58C and move at a predetermined speed in the longitudinal direction of the furnace 40C, so that the substrates 54 which are suspended from the holder 56 pass through the heating chamber 44 in a predetermined time. In FIG. 9, a furnace 40D is shaped generally tunnel-like.

The lid 46 is integrated with the body 42 and has a multiplicity of very narrow apertures 58D. The body 42 has no wall at the front and rear ends, and a conveyor 62 is arranged to pass through the heating chamber 44. The conveyor 62 carries thereon an open-top container 64 which is shaped to fit in closely and slidably with the heating chamber 44. The substrates 54, suspended from the holder 56, are disposed in the container 64 and caused to pass through the heating chamber 44 in a predetermined time with the travel of the conveyor 62. When the container 64 is in the heating chamber 44, the interior of the container 64 communicates with the atmosphere exclusively through a definite portion of the apertures 58 and serves as a semi-closed heating chamber.

In a method of the invention, the substrate 54 is prepared by the same procedure as in the conventional methods. A valve metal such as tantalum or aluminum usually in the form of a cylindrically shaped and sintered body is electrolytically oxidized in a solution of phosphoric acid, citric acid or acetic acid to form a thin dielectric oxide film thereon. Then the substrate is immersed in an aqueous solution of manganese nitrate, and the wet substrate is heated in the above described furnace 40 (typified) to cause pyrolytic decomposition of manganese nitrate to manganese dioxide.

Since the pyrolytic decomposition occurs in the semi-closed chamber 44 wherein air is neither forced to circulate nor stirred, the decomposition gas (consisting of steam and oxides of nitrogen) is not freely discharged from the chamber 44 but is retained, at least partly, therein almost over the entire reaction time. Consequently, the substrate 54 is kept under a slightly pressurized atmosphere attributable to the partial pressure of the decomposition gas. The invention is based on our discovery that the thus created positive pressure of a small magnitude has a favorable effect on the quality of the manganese dioxide layer formed by the pyrolytic decomposition. The substrate 54 in the heating chamber 44 is kept at a constant temperature in the range from 130° to 350° C which is not different from usual temperatures for the decomposition of manganese nitrate in the conventional methods.

The heating chamber 44 must not be closed completely since a resulting excessive increase in the chamber pressure causes a considerable amount of manganese nitrate to scatter into the chamber 44 from the surface of the dielectric oxide film and results in less deposition of manganese dioxide on the oxide surface, which is disadvantageous for producing a capacitor of good quality. If, on the contrary, the chamber 44 is amply open to the atosphere, the pyrolytic decomposition fails to give a satisfactorily densely formed layer of manganese dioxide. If circulation or stirring of hot-air is performed in the heating chamber 44 which is adequately semi-closed throughout the repeated pyrolytic decomposition, manganese dioxide is formed as a very rugged, porous and crumbly layer.

To obtain most favorable results, the effective area of the vent 58 is determined such that the magnitude of the positive pressure attributable to the decomposition gas is in the range from 5 to 100 mm $H_2O$ in gage pressure. The following advantages are derived from the use of the semi-closed radiant furnace 40 and maintenance of the above described positive pressure.

1. A capacitor which has a satisfactorily large and an excellent frequency characteristic and exhibits only an extremely small leakage current can be produced even when a considerably concentrated manganese nitrate solution is used.

2. Due to the use of such a concentrated manganese nitrate solution, manganese dioxide layer having a satisfactorily large capacitance can be formed by repeating the pyrolytic decomposition only 2 to 4 times compared with about 10 times of repetition needed in the conventional methods.

3. It is not necessary to control the temperature of the manganese nitrate solution at the immersion of the substrate therein, and the immersion can be completed in a shortened time.

Figure 15:
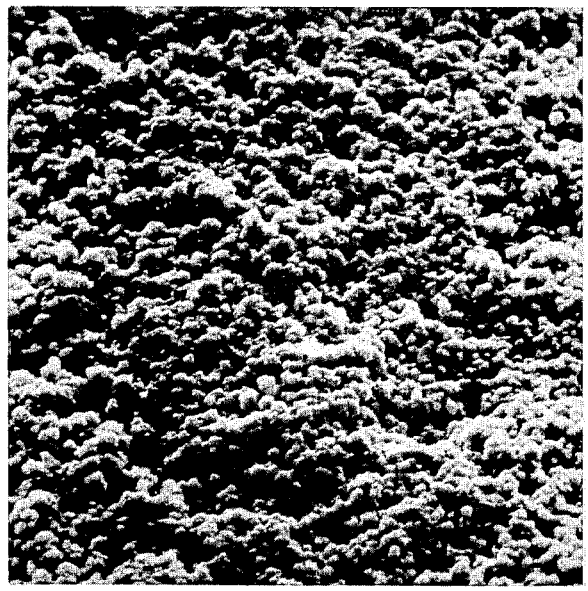
FIGS. 15-17 are similar microphotographs showing three different examples of manganese dioxide layers formed by a method according to the invention, respectively.
Figure 16:
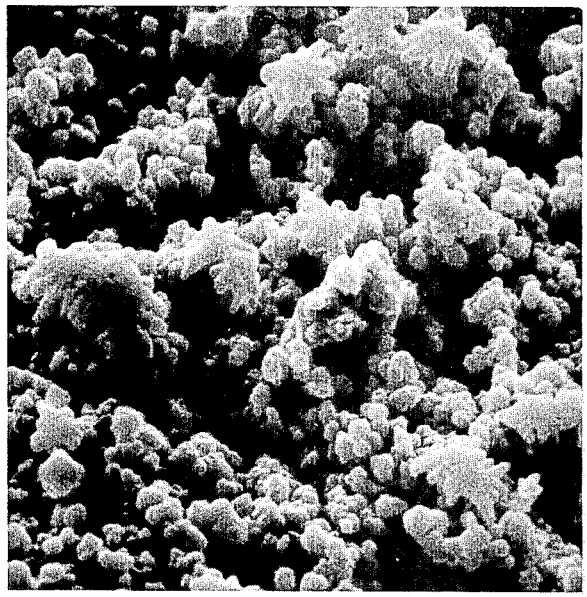
Figure 17:
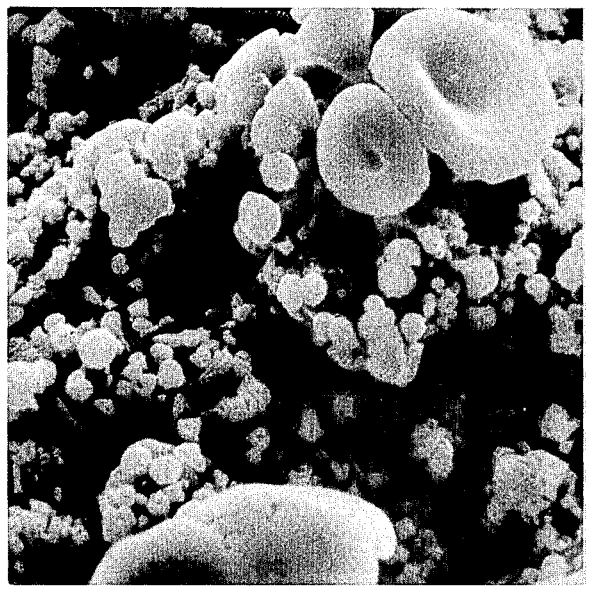

4. The manganese dioxide layer is formed in greatly improved quality. As seen in the microphotographs of FIGS. 15-17, the manganese dioxide layer is very smooth and dense and has a metallic luster. A black-colored layer is formed when the pyrolytic decomposition is carried out according to conventional methods, but a silver-gray manganese dioxide layer is formed by a method of the invention. On the whole, a manganese dioxide layer according to the invention is comparable with a layer of the same material formed by electrolytic deposition in the texture and intimate contact with the substrate. The pores or interstices of the oxide-coated valve metal are well coated with manganese dioxide. This results presumably from intrusion or infiltration of manganese nitrate into the interstices caused by the maintenance of a slight positive pressure in the chamber 44 during the pyrolytic decomposition. The particle size of manganese dioxide formed by a method of the invention varies depending on the conditions under which the decomposition is carried out. In the three examples shown in FIGS. 15-17 (the magnification of these microphotographs is 1000X), the particle size is in the range from 2 to 8 $\mu$m. A capacitor of satisfactorily good quality can be produced when the manganese dioxide layer consists of the particles of from 0.1 to 50 $\mu$m.

5. A manganese dioxide layer formed by a method of the invention has superior properties in almost every respects to a similar layer formed by a known method wherein steam or water is introduced into the furnace during pyrolytic decomposition of manganese nitrate.

Important matters with respect to the semi-closed radiant furnace for use in a method of the invention will be described hereinafter in more detail.

As described previously, the body 42 and the lid 46 of the furnace 40 are preferably made of a metal from the viewpoints of heat conductivity and accuracy in machinning, but a non-metallic material which has a good heat conductivity at elevated temperatures can be used if the material affords sufficient accuracy in machinning. The furnace 40 should be designed to have a sufficiently large heat capacity to prevent any substantial reduction in the chamber temperature resulting from heat absorption by the substrate. As to the vent 58, the effective area thereof is of an essential concern, but the position has little influence on the result of the pyrolytic decomposition. The vent 58 may be formed in the lid 46, an end or side wall of the body 42 or the bottom 42a, or along the contact faces between the body 42 and the lid 46.

The semi-closed state of the furnace 40 reaction chamber 44 depends on the following variables:

a. the volume V of the chamber 44,
b. the quantity G of the decomposition gas liberated from the web substrates 54 in the chamber 44,
c. the inner surface area S of the entire wall of the chamber 44, d. the heat load or the total mass of the heat load, i.e., the total mass W of the substrates 54, and e. the total area A of the vent 58. Other variables such as the pressure in the chamber 44, the rate of increase in the temperature of the substrate 54, variations in the quantity of the decomposition gas with progress of the decomposition, and the quantity of heat transferred from the furnace 40 to the substrates 54 in a unit time are determined by the following relationships between the factors (a) to (e).

The pressure in the chamber 44 depends mainly on the following three ratios:

I. (the chamber volume, V)/(the vent area, A),

II. (the gas volume, G)/(the vent area, A), and

III. (the gas volume, G)/(the chamber volume, V).

The rate of increase in the temperature of the substrates 54, and variations in the quantity of the decomposition gas with progress of the decomposition are related to the following two ratios:

IV. (the chamber volume, V)/(the mass of the substrates, W) and

V. (the surface area, S)/(the mass of the substrates, W).

The ratio (V) governs also the quantity of heat transferred from the furnace to the substrates 54 in a unit time. The excellent properties of the manganese dioxide layer as described hereinbefore can be attained when these ratios take values in the following ranges, respectively.

I. V/A is from 50 to 2000 $cm^3/cm^2$

II. G/A is from 100 to 10000 $ml/cm^3$

III. G/V is from 0.01 to 1000 $ml/cm^3$

IV. V/W is from 2 to 1000 $cm^3/g$ with tantalum substrates.

V. S/W is from 2 to 500 $cm^2/g$ with tantalum substrates.

It will be apparent that the reaction condition is determined by these ratios and that these ratios are correlated to each other.

A manganese dioxide layer of excellent quality can be formed when the pyrolytic decomposition is carried out under the above described condition throughout the entire repetition of the decomposition procedures. However, the appearance and denseness of a manganese dioxide layer formed by a conventional method can be improved to certain extents if at least one cycle of the repeated pyrolysis is carried out in accordance with the invention.

A few examples will be presented hereinafter to further illustrate the invention.

EXAMPLE 1

A cylindrically shaped and sintered substrate of tantalum which weighed 100 mg was anodized in a phosphoric acid solution at room temperature to form a dielectric oxide coating thereon. The anodizing potential was brought to 30 V over a period of 2 hr. A plurality of the thus prepared substrates were divided into four groups, and the first group was subjected to a conventional process for forming a manganese dioxide layer on the dielectric. The substrates of the first group were immersed in an aqueous solution of manganese nitrate and then heated at 250° C in a usual hot-air circulation furnace. The immersion and heating were repeated 10 times by the use of three differently concentrated manganese nitrate solutions, i.e., 25%, 35% and 45% (by weight) solutions, wherein the solutions of relatively high concentrations were used at later stages of the repetition.

The substrates of the other three groups were subjected to the pyrolytic decomposition process according to the invention by the use of a semi-closed radiant furnace. Three differently concentrated, i.e., 62%, 72% and 83% (by weight), aqueous solutions of manganese nitrate were used for these three groups, respectively. (It is impossible to form a manganese dioxide layer of an acceptable quality if these highly concentrated solutions were used in a conventional process.) With the substrates of these three groups, the combination of immersion in the solution and heating in the semi-closed furnace was repeated only 3 times.

For all of these three groups, the above defined ratio V/A (I) was 500 $cm^3/cm^2$ and the ratio (G/A (II) was 2000 $ml/cm^3$. The temperature of the substrate 54 was maintained at 250° C.

Figure 18:
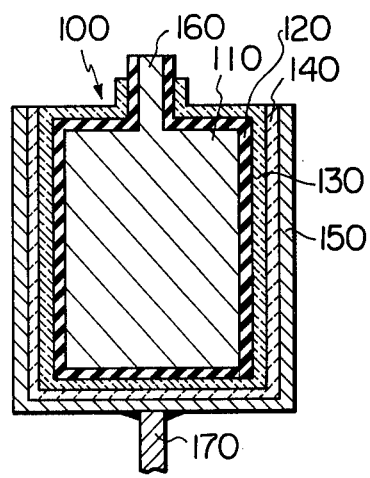
FIG. 18 is a longitudinal sectional view of a solid electrolyte capacitor in accordance with the invention.

After completion of the repeated pyrolytic decomposition, the substrates which were coated with a manganese dioxide layer were subjected to usual procedures for the production of solid electrolyte capacitors as shown in FIG. 18. A solid electrolyte capacitor 100 of FIG. 18 has a well known structure. An anode 110 is of either tantalum or aluminum and usually in the form of a porous and sintered mass. A dielectric oxide coating 120 is formed by electrolytical oxidation on the surface of the anode 110, and a manganese dioxide layer 130 is formed on the surface of the dielectric 120. A colloidal graphite 140 was applied onto the surface of the manganese dioxide layer 130 followed by application of a conductive paint containing, e.g., a silver powder dispersed therein to form a metallic coating 150. A lead 160 extends from the anode 110, and another lead 170 was connected to the coating 160 by soldering. For practical uses, the capacitor 100 may be covered with a protective layer (not shown).

With respect to the thus constructed capacitors, capacitance as a relative value to a theoretical value, leakage current, loss and the rate of decrease in the capacitance at 10 kHz from a reference at 120 Hz were as summarized below in Table 1.

Table 1

|  | Group 1 (conventional method) | Group 2 | Group 3 | Group 4 |
|---|---|---|---|---|
|  |  | (method of invention) | | |
| Mn(NO$_3$)$_2$ solution | 25%, 35% and 45% | 62% | 72% | 83% |
| Repetition of pyrolysis | 10 times | 3 times | 3 times | 3 times |
| Relative capacitance (%) | 96% | 94% | 95% | 94% |
| Leakage current at 20 V (μA) | 0.12 | 0.02 | 0.03 | 0.02 |
| Loss, CR (Ω . μF)/120Hz | 35 | 25 | 16 | 9 |
| Rate of decrease in capacitance, 10 kHz/120 Hz (%) | −7.0 | −1.5 | 0 | 0 |

The distance between the substrate 54 and the inner surface of the wall 42 from which heat is radiated is considered a subsidiary factor in the success of a method according to the invention. In general, heat transfer by radiation from a flat-faced heat source is not greatly influenced by the distance from the heat source. The matter is somewhat different, however, when the pyrolytic decomposition of manganese nitrate is carried out in a semi-closed radiant furnace. Gaseous substances such as steam and oxides of nitrogen which are liberated during decomposition are not allowed to leave the heating chamer 44 freely. As the decomposition proceeds, these gases tend to stagnate and be stratified along the wall surface and serve as a medium for heat transfer. As a result, heat transfer by conduction and convection becomes dominant over heat transfer by radiation at a certain stage of the decomposition. The influence of the distance between the wall surface and the substrate 54 on the temperature of the substrate 54 is not complete negligible especially when the number of the substrates 54 in the chamber 44 is relatively large or when the mass of the individual substrate 54 is relatively large. This influence was examined in the following example.

EXAMPLE 2

Two groups of differently weighing cylinders of sintered tantalum, (A) weighing 100 mg and (B) weighing 3000 mg, were anodized in a 0.05 Wt% citric acid solution for 2.5 hr up to 70 V. The thus prepared substrates 54 were immersed in a 58 Wt% aqueous solution of manganese nitrate and then heated at 280° C in the semi-closed radiant furnace 40 of FIG. 3, wherein the ratio V/A was 500 $cm^3/cm^2$ and the ratio G/A was 4500 $ml/cm^2$. The immersion and the heating were repeated 3 times for the substrate 54(A), but 7 times for the larger substrate 54(B).

Figure 10:
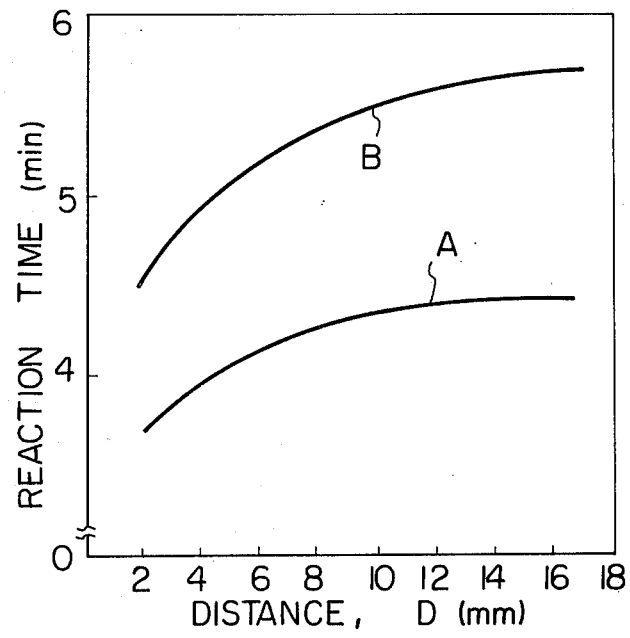
FIG. 10 is a graph showing the variations in the decomposition reaction time in the furnace of FIG. 3 with respect to variations in the shortest distance between the inner surface of the furnace and a tantalum anode held in the furnace.

With both groups (A) and (B), the distance D between the lower end of each substrate 54 and the inner surface of the bottom wall 42a of the furnace 40 was varied over the range from 2 to 18 mm to examine variations in the heating time needed to complete the pyrolytic decomposition of manganese nitrate adhering to the substrates 54. The results are shown in the graph of FIG. 10.

Figure 11:
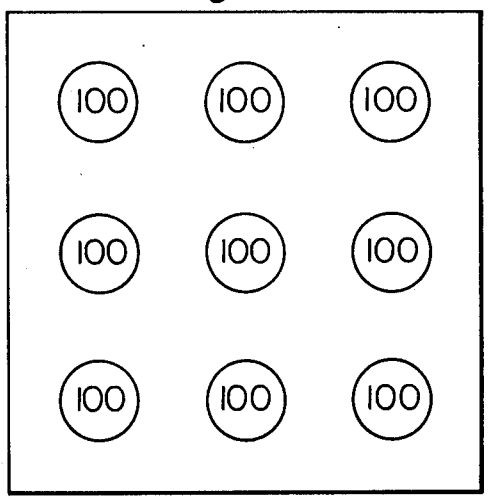
FIGS. 11 and 12 are diagrams showing the dependence of a relative capacitance (%) to a theoretical value of a capacitor according to the invention on the position of the anode in the same furnace during the pyrolytic decomposition of manganese nitrate with respect to two different distances between the inner surface of the furnace and the anode, respectively.
Figure 12:
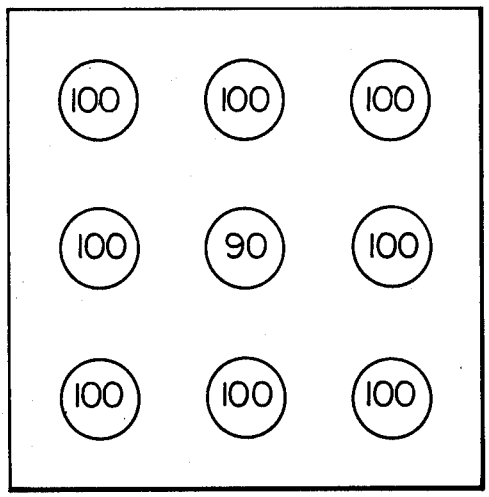

Thereafter, the substrates 54 having the manganese dioxide layer 130 were treated in accordance with Example 1 to produce the capacitors 100. Measurement of capacitance with the capacitors 100 produced from the substrates 54 of group (B) revealed, as shown in FIG. 11, that the capacitance was approximately equal to a theoretical value (100%) irrespective of the horizontal position of the substrate 54 in the heating chamber 44 when the distance D was in the range from 2 to 10 mm. When, however, the distance D was 13 mm or longer, the substrate 54(B) positioned in the central region of the chamber 44 gave the capacitor 100 of an insufficient capacitance as shown in FIG. 12.

The distance D is to be considered as the shortest distance between the substrate 54 and any side of the inner surface of the wall 40. It is preferable to arrange the substrate 54 in the chamber 44 such that the distance D is in the range from 2 to 10 mm from the viewpoints of both the practicability of the pyrolytic decomposition procedure and achievement of a highest capacitance. This range of the distance D is advantageous also to the other characteristics of the capacitor 100.

Figure 13:
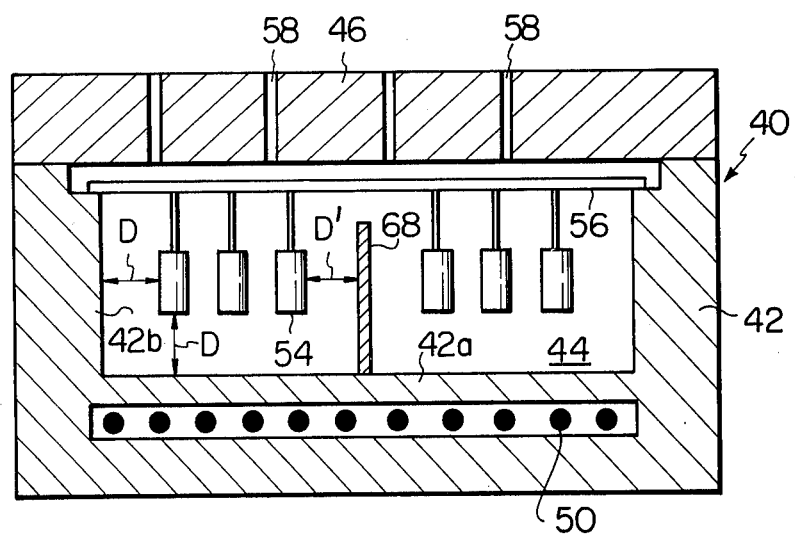
FIG. 13 is a longitudinal view of a furnace as a still another modification of the furnace of FIG. 3.

In regard to maintenance of the distance D within the foregoing range, the furnace 40 is preferably provided with at least one radiant plate 68 which extends from the inner surface of the wall 42a into a central region of the chamber 44 as shown in FIG. 13 when the chamber 44 is relatively wide or spacious. The distance D' between the radiant plate 68 and the nearest substrate 54 is preferably in the range from 2 to 10 mm similarly to the above described distance D.

When the vent 58 of the furnace 40 is provided as a single or a plurality of through holes formed in either the lid 46 or the side wall 42b, the length of the vent 58, i.e., the thickness of the lid 46 or the wall 42b, has certain effects on the results of the pyrolytic decomposition.

EXAMPLE 3

A group of cylinders of sintered tantalum each of which weighed 3.0 g were anodized in accordance with Example 2. The thus prepared substrates 54 were wetted with an aqueous solution of manganese nitrate by the use of two differently concentrated solutions, one was a 40% solution and the other 62%, and heated in the furnace 40 of FIG. 3. The vent 58 was formed as vertical and straight holes in the lid 46. This example was carried out to examine the effects of the length of the vent 58 on the appearance of the deposited manganese dioxide layer and the characteristics of the capacitor 100 with respect to four differently thick lids 46. The pyrolytic decomposition of manganese nitrate was carried out by placing 36 pieces of substrates 54 in the chamber 44 at one time with each lid 46. The immersion and heating procedures were repeated 8 times by the use of the 40% solution for the first 4 times and the 62% solution for the subsequent 4 times. The results of measurements are presented in Table 2 in mean values.

Table 2

| Lid thickness | Appearance of $MnO_2$ layer | Capacitance (%) | Loss (tan δ, %) | Leakage current (20 V, 5 min, ∞A) |
|---|---|---|---|---|
| 5 mm | smooth and uniform | 99.0 | 2.5 | 0.1 - 0.3 |
| 10 mm | " | 99.5 | 2.4 | 0.1 - 0.2 |
| 30 mm | " | 99.3 | 2.4 | 0.1 - 0.2 |
| 50 mm | smooth, but a little inferior | 90.2 | 2.6 | 0.1 - 0.6 |

(The capacitance is given as a relative value to a theoretical value.)

In the furnace 40 of FIG. 3 which has the detachable lid 46, the thickness of the lid 46 is considered to be at least 5 mm since a thinner lid is liable to be momentarily forced up by the gas pressure in the heating chamber 44 and cause the chamber 44 to deviate from the semi-closed state. Such opening of the lid 46 during progress of the pyrolysis, even locally and/or momentarily, results in inferior adhesion of the manganese dioxide layer to the dielectric. If, on the contrary, the lid 46 is excessively thick, the decompostion gas is prevented from being discharged from the chamber 44 at an adequate rate, so that the rate of heat transfer to the substrate 54 cannot be maintained uniform and constant. A natural increase in the size of the furnace 40 also leads to less uniformity of the temperature distribution in the chamber 44. Consequently, a lid thickness, i.e., length of the vent 58, larger than 50 mm has detrimental influences on the properties of the manganese dioxide layer or the capacitor 100, particularly on the relative capacitance to the theoretical value. The lid 46 is, therefore, preferably from 5 to 30 mm thick with respect to the furnace 40 of FIG. 3, and the same holds with the thickness of the wall 42b when the vent 58 is formed therein.

What is claimed is:
1. A method of producing a solid electrolyte capacitor having a layer of manganese dioxide as the solid electrolyte, the method comprising the steps of:
   a. preparing a substrate by forming a dielectric oxide coating on a surface of a valve metal member;
   b. immersing said substrate in an aqueous solution consisting of water and manganese nitrate; and c. heating the wet substrate to cause pyrolytic decomposition of manganese nitrate to manganese dioxide in a heating chamber of a radiant furnace, said chamber being semi-closed and in communication with the atmosphere exclusively through at least one vent formed in the wall of said chamber, heat for said pyrolytic decomposition being transferred to said substrate exclusively from the wall of said chamber dominantly by radiation, said at least one vent having a predetermined area such that said pyrolytic decomposition proceeds under a positive pressure ranging from 5 to 100 mm $H_2O$ in gage pressure attributable only to a relatively prolonged retention of gaseous decomposition products of said pyrolytic decomposition in said chamber.

2. A method as claimed in claim 1, wherein said predetermined area is such that the ratio of the volume of said chamber to the total area of said at least one vent is in the range from 50 to 2000 $cm^3/cm^2$, while the ratio of the quantity of said gaseous products to said total area is in the range from 100 to 10000 $ml/cm^2$.

3. A method as claimed in claim 2, wherein the capacity of said chamber and the mass of said substrate are adjusted correlatively such that the following relationships hold, said valve metal being tantalum, the ratio of said volume to said mass is in the range from 2 to 1000 $cm^3/g$, the ratio of the total area of the inner surface of said wall to said mass is in the range from 2 to 500 $cm^2/g$, and the ratio of said quantity to said volume is in the range from 0.01 to 1000 $ml/cm^3$.

4. A method as claimed in claim 2, wherein the concentration of said aqueous solution is at least 60% by weight.

5. A method as claimed in claim 2, wherein the shortest distance between said substrate at the step (c) and said wall is in the range from 2 to 10 mm.

6. A method as claimed in claim 5, wherein at least one radiant plate is arranged in said chamber to extend from said wall into a central region of said chamber, the shortest distance between said substrate at the step (c) and said radiant plate being in the range from 2 to 10 mm.

7. A method as claimed in claim 2, further comprising the step of repeating said steps (b) and (c) consecutively at least once again subsequently to said step (c).

8. A method as claimed in claim 7, wherein the concentration of said aqueous solution is varied during the repetition within the range from about 25 to about 83 wt% such that a relatively high concentration is employed at a later stage of the repetition.

9. A method as claimed in claim 8, wherein said wet substrate is heated to a temperature in the range from about 130° to about 350° C in the step (c).

10. A method as claimed in claim 1, wherein said wall is made of a heat-conductive material selected from the group consisting of iron, nickel, copper, aluminum and alloys of these metals.

11. A method as claimed in claim 1, wherein said wall is made of silicon carbide.

12. A method of producing a solid electrolyte capacitor having a layer of manganese dioxide as the solid electrolyte, the method comprising the steps of:

a. preparing a substrate by forming a dielectric oxide coating on a surface of a valve metal member;

b. immersing said substrate in an aqueous solution consisting of water and manganese nitrate; and c. heating the wet substrate in air at a temperature in the range from about 130° to about 350° C to cause pyrolytic decomposition of manganese nitrate to manganese dioxide in a heating chamber of a radiant furnace exclusively by the transfer of heat to said substrate from the wall of said chamber dominantly by radiation without the feed of any external fluid to said chamber or an intentional circulation of air in said chamber, said chamber being semi-closed and in communication with the atmosphere exclusively through at least one vent formed in the wall of said chamber, said at least one vent having a predetermined area such that the ratio of the quantity of said gaseous products to said total area is in the range from 100 to 10,000 $ml/cm^2$; and that said sbstrate is under a positive pressure ranging from 5 to 100 $mmH_2O$ in gage pressure during said pyrolytic decomposition, said positive pressure being attributable only to a natural restriction on the discharge of gaseous decomposition products of said pyrolytic decomposition by said at least one vent.

13. A method as claimed in claim 12, wherein the capacity of said chamber and the mass of said substrate are adjusted correlatively such that the following relationships hold, said valve metal being tantalum, the ratio of said volume to said mass is in the range from 2 to 1000 $cm^3/g$, the ratio of the total area of the inner surface of said wall to said mass is in the range from 2 to 500 $cm^2/g$, and the ratio of said quantity to said volume is in the range from 0.01 to 1000 $ml/cm^3$.

14. A method as claimed in claim 13, further comprising the step of repeating said steps (b) and (c) consecutively at least once again subsequently to said step (c).

15. A method as claimed in claim 14, wherein the concentration of said aqueous solution is varied during the repetition within the range from about 25 to about 83 wt% such that a relatively high concentration is employed at a later stage of the repetition.

* * * * *